United States Patent Office 2,878,512
Patented Mar. 24, 1959

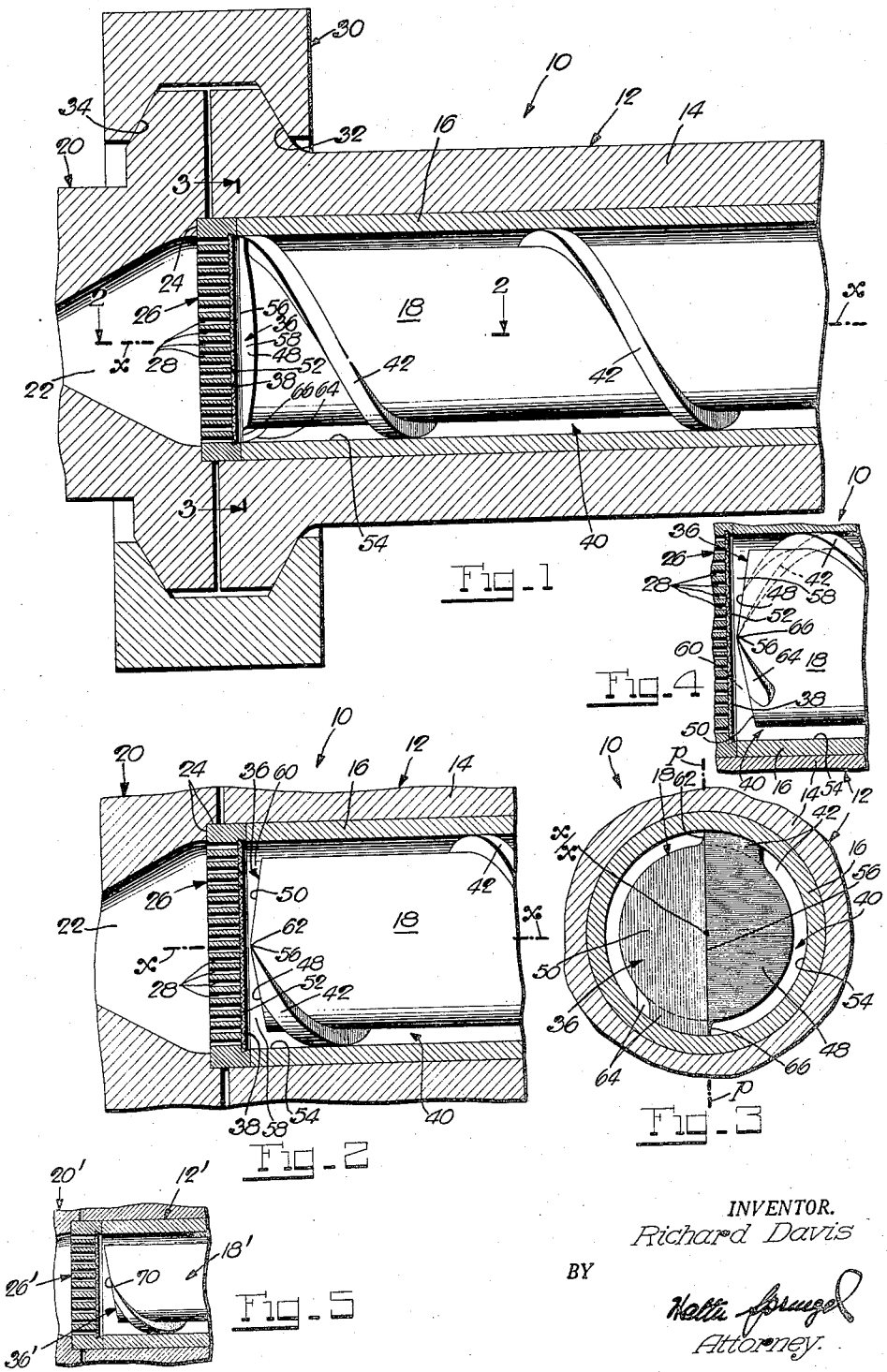

2,878,512

EXTRUSION APPARATUS WITH STOCK-DISPLACING DISCHARGE END ON FEED SCREW

Richard Davis, Mystic, Conn., assignor to Standard Machinery Division of Franklin Research Corporation, Mystic, Conn., a corporation of Delaware Application January 7, 1957, Serial No. 632,750

4 Claims. (Cl. 18—12)

This invention relates to extrusion apparatus in general, and to the feed of plastic stock through extrusion cylinders in particular.

As is customary in extrusion apparatus, the extrusion mass, hereinafter simply referred to as "stock," is impelled by a power-driven feed screw in the cylinder toward and through a breaker plate between the latter and the usual extrusion head in which the stock is conducted to the extrusion die. The breaker plate with its multiplicity of relatively small apertures intermixes the passing stock even more thoroughly than the feed screw during the stock advance in the cylinder, with the result that the stock delivered to the extrusion head and ultimately to the extrusion die is of optimum uniformity in its consistency for best extrusion results. Customarily, the feed screw is extended into close proximity to the breaker plate with a view toward keeping the stock in uninterrupted and uniform motion through the cylinder and breaker plate. However, this expediency has proved inadequate to prevent more or less non-uniform delivery of stock into the extrusion head throughout its cross-sectional area due to uneven displacement of stock from between the feed screw and breaker plate, with the result that the desired uniformity of the stock delivery to the extrusion die may be adversely affected and, more importantly, some stock will occasionally become spoiled on its unduly prolonged travel through the extruder and require annoying stoppage of an extrusion operation in the middle thereof.

There have also become known special impellers which are formed integral with or separate from the feed screws as continuations of the latter to the breaker plate, and which are specially shaped over their longitudinal extent in an endeavor to prevent the same adverse stock condition adjacent the entry side of the breaker plate. However, these impellers not only shorten the effective lengths of the feed screws, but also require extensive and rather complicated machining, with the result that intermixing of the stock is not as thorough as desired unless special length is added to the extrusion cylinders, and the cost of these impellers adds quite considerably to that of the extruder equipment.

It is the primary aim and object of the present invention to provide an extrusion apparatus a feed screw which extends with its full effective length into close proximity to the breaker plate and has at its very discharge end simple provisions to effect continuous and most uniform displacement of stock thereat into and through the breaker plate throughout its cross-sectional expanse, thereby not only to avoid the aforementioned adverse stock condition adjacent the entry side of the breaker plate and the annoying and even damaging consequences therefrom, but to achieve this without costly special impellers or adding to the length of the extrusion cylinder, or both.

It is another object of the present invention to form the very discharge end of a conventional feed screw in extrusion apparatus as a substantially plane wedge surface which extends in close proximity to the breaker plate and forms throughout with the adjacent face of the latter a preferably acute angle, thereby to achieve a rather abrupt change from the chiefly axial flow direction of the stock at the discharge end of the feed screw transversely into the narrow wedge space thereat and, by the dual factors of the back pressure on the stock in this wedge space and the rotation of the wedge surface with the feed screw, a rather forceful wedge action on this stock which not only continuously brings stock into pressure contact with the breaker plate throughout its cross-sectional expanse, but also prevents any part of the stock from pausing in this wedge space and appreciably lagging behind the displacement rate of the other stock therein through the breaker plate.

It is a further object of the present invention to arrange the aforementioned wedge surface on the discharge end of a conventional feed screw in equal sections of which the substantially plane wedge surfaces are angularly spaced from each other and all extend outwardly from the axis of the feed screw, thereby not only to enhance the overall wedge action on the stock in the wedge space, but also to place only sections of the cross-sectional expanse of the breaker plate corresponding to the individual wedge sections at any instant under more clearly defined stock displacement control of the latter with a resultant more nearly uniform displacement rate of the stock from the wedge space at any instant throughout the cross-sectional expanse of the breaker plate.

Another object of the present inventon is to arrange the aforementioned wedge surface on the discharge end of a conventional feed screw in two diametrically opposite equal sections from the axis of the feed screw so that their plane wedge surfaces converge in a rectilinear line which passes through and extends at right angles to the screw axis, and serves as an edge that substantially wipes the stock from the adjacent face of the breaker plate once during each revolution of the feed screw, thereby offering still greater assurance that on part of the stock will pause in the wedge space and appreciably lag behind the displacement rate of the other stock therein through the breaker plate.

A further object of the present invention is to arrange the aforementioned diametrically opposite wedge sections on the discharge end of a conventional feed screw so that the aforesaid diametrical wiper edge coincides with, and is continued to the inner wall of the extrusion cylinder by, the adjacent and turnwise trailing terminal edges of the flights of the feed screw, thereby to extend the stock-wiping action of the screw over the entire adjacent face of the breaker plate.

It is another object of the present invention to achieve the same full extension of the aforementioned wiper edge to the inner wall of the extrusion cylinder with a feed screw of only a single flight, by providing over an end length of the screw adjacent its discharge end a flight section or stub which extends in the same direction as, but is displaced 180 degrees from, the full flight on the screw and has its turnwise trailing terminal edge at the discharge end of the screw in line and continuous with the wiper edge.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a fragmentary longitudinal section through extrusion apparatus embodying the present invention;

Figs. 2 and 3 are fragmentary sections through the same extrusion apparatus, taken substantially on the lines 2—2 and 3—3, respectively, of Fig. 1;

Fig. 4 is a fragmentary section similar to Fig. 2, but showing the feed screw of the extrusion apparatus in a different angular position; and Fig. 5 is a fragmentary longitudinal section through extrusion apparatus embodying the present invention in a modified manner.

Referring to the drawings, and more particularly to Figs. 1 to 4 thereof, the reference numeral 10 designates apparatus for extruding stock such as natural or synthetic rubber mixes or synthetic thermoplastics. The apparatus comprises an extrusion cylinder 12, presently formed by a jacket 14 and a liner 16 therein, a feed screw 18 in the cylinder, and an extrusion head 20 having the usual stock passage 22 to an extrusion die (not shown). Seated partially in an annular recess 24 in the head 20 and partially in the front end of the cylinder jacket 14 is a breaker plate 26 having the usual apertures 28. The breaker plate 26 is firmly retained in interposition between the cylinder liner 16 and the head 20 by a split clamp 30 which is in wedging engagement with frusto-conical surfaces 32 and 34 of the cylinder jacket 14 and head 20, respectively, and also secures the latter to the former. The feed screw 18 extends with its forward or discharge end 36 into close proximity to the breaker plate 26 the adjacent face of which may be lined with a screen 38, and the cylinder 12 is in its rear provided with a stock inlet (not shown) to the cylinder chamber 40 in which the feed screw 18 is turnable. The feed screw 18 is, in the present instance, provided with a single helical flight 42 which is adapted, on the power-drive of the feed screw, presently in counterclockwise direction as viewed from the right end of Fig. 1, to feed stock in the cylinder chamber 40 forwardly therein toward and through the breaker plate 26 into the passage 22 in the head 20 and to the extrusion die. The stock, which is introduced in a solid state into the cylinder chamber 40, becomes in the course of its forced forward feed therein by the screw 18 heated and, in consequence, softens and eventually reaches the proper plastic state for extrusion. The requisite heating of the stock in the cylinder chamber 40 is achieved by the internal and mechanical friction encountered by the stock while being worked therein forward by the feed screw 18, and if necessary by additional heat from the usual heating means in or on the cylinder jacket 14. Recourse may also be had to the usual cooling means in the cylinder jacket for close heat control over the stock. The stock is broken up into even smaller masses and, hence, most thoroughly intermixed, on its forced passage through the screen 38 and the multiplicity of relatively small apertures 28 in the breaker plate 26, so as to have optimum uniformity in its consistency on its passage through the head 20 and ultimately through the extrusion die for a satisfactory extrusion operation.

The discharge end 36 of the feed screw 18 is, in accordance with the present invention, formed to achieve continuous displacement of stock thereat into the breaker plate 26 uniformly throughout the cross-sectional expanse of the latter. To this end, the discharge end 36 of the feed screw is, in the present instance, formed by two adjacent front end surfaces 48 and 50 thereof which presently are of equal semicircular sector extent (Fig. 3) and lie in planes which form with the adjacent face 52 of the breaker plate preferably identical acute angles, respectively, that point inwardly from the inner cylinder wall 54 (Fig. 2). The face 52 of the breaker plate 26 lies, in turn, in a plane normal to the coincident axes x—x of the cylinder chamber 40 and feed screw 18 (Figs. 1 and 2). Furthermore, the planes in which the end surfaces 48 and 50 of the feed screw 18 lie (Fig. 2) are preferably so arranged that they intersect each other and a plane p—p, in which the coincident axes x—x of the cylinder chamber and feed screw lie, along a single line 56 which extends normal to these coincident axes x—x (Figs. 1 and 3).

The line 56 constitutes the meeting edge between the end surfaces 48 and 50 of the feed screw 18, and serves effectively to wipe stock from the adjacent face of the exemplary screen-lined breaker plate 26 once during each revolution of the feed screw, as will be readily understood. The end surfaces 48 and 50 of the feed screw 18, on the other hand, serve as wedge surfaces in fairly close proximity to the breaker plate 26, whereby there is achieved a rather abrupt change from the chiefly axial flow direction of the stock at the discharge end of the feed screw 18 transversely into the rather narrow wedge spaces 58 and 60 thereat (Fig. 2) and, by the dual factors of the back pressure on the stock in these wedge spaces 58 and 60 and the rotation of the wedge surfaces 48 and 50 with the feed screw, a rather forceful wedge action on this stock which not only continuously brings stock into pressure contact with the breaker plate throughout its cross-sectional expanse, but also prevents any part of the stock from pausing in these wedge spaces and appreciably lagging behind the displacement rate at any instant of the other stock therein into and through the breaker plate. Of course, the formation of the front end of the feed screw 18 in plural, and presently in dual, wedge surface fashion, and the described identical formation and disposition of the dual wedge surfaces 48 and 50, not only enhance the overall wedge action on the stock in the wedge spaces 58 and 60, but also place only sections of the cross-sectional expanse of the breaker plate 26 corresponding to the individual wedge surfaces 48 and 50 at any instant under more clearly defined stock displacement control of the latter with a resultant more nearly uniform displacement rate of the stock at any instant into the breaker plate throughout its cross-sectional expanse.

In order to extend the wiping edge 56 at least on one end thereof to the inner cylinder wall 54, the wedge surfaces 48 and 50 are preferably so arranged that the wiping edge, which is their meeting edge as described, is in line and continuous with the turnwise trailing terminal edge 62 of the single flight 42 of the feed screw at its forward end (Figs. 2 and 3). Preferably, the wiping edge 56 is also at its other end extended to the cylinder wall 54 in order to sweep the breaker plate 26 throughout its exposed cross-sectional expanse and thus enhance its wiping action thereon. To this end, the feed screw 18 has another helical flight 64, presently a relatively short stub extending from the forward end of the feed screw over an end length only of the latter (Fig. 4), which is spaced 180 degrees from, and extends unidirectionally with, the full flight 42, and its turnwise trailing terminal edge 66 at the forward end of the feed screw aligns and is continuous with the meeting edge 56 of the wedge surfaces 48 and 50 (see also Figs. 1 and 3). Of course, the flight stub 64 may be continued throughout the longitudinal expanse of the feed screw, in which case the latter would be of the double-flight type. However, insofar as fairly even distribution of the stock into the wedge spaces 58 and 60 is concerned, the present exemplary single-flight screw 18 is as effective as a double-flight screw, this by virtue of the provision on the former of the described flight stub 64, as will be readily understood.

The wedge surfaces 48 and 50 are preferably machined on the forward end of the feed screw 18, and this is a relatively simple task. Thus, the described unique and highly advantageous uniform stock wedging and wiping action is achieved by a simple machining operation on the forward end of a conventional feed screw, which adds only inappreciably to the cost of the latter.

Insofar as orientation of the wiping edge 56 and of the wedge surfaces 48 and 50 with the feed screw 18 alone is concerned, the wedge surfaces 48 and 50 lie in planes which intersect each other and a plane in which the screw axis lies, along a single line that extends normal to the latter and constitutes the meeting edge of these wedge surfaces, as well as the foremost edge of the screw, and the wedge surfaces form identical acute angles with a plane which extends normal to the screw axis and is coincident with this edge.

Fig. 5 shows a modified discharge end 36' on a feed screw 18' in an extrusion cylinder 12' adjacent a breaker plate 26' between the cylinder and an extrusion head 20'. In the present instance, the discharge or forward end 36' of the feed screw 18' is formed as a single wedge surface 70 which, like either of the wedge surfaces 48 and 50 of the described feed screw 18, preferably lies in a plane that intersects a plane in which the screw axis lies, along a line which extends normal to the latter. The present, single wedge surface 70 is, of course, not as effective as the multi-wedge surfaces of the described feed screw 18 in achieving optimum uniformity of the displacement of stock at any instant into and through the breaker plate throughout its cross-sectional expanse, but it may nevertheless perform satisfactorily for certain extrusion operations. Also, the present, single-wedge surface 70 leaves the forward end of the feed screw without a wiper edge which, however, may be dispensed with without detriment to certain extrusion operations.

While the feed screws 18 and 18' in Figs. 1 and 5, respectively, are each shown in the form of a hub which is cylindrical throughout and on the periphery of which the helical flight means extend, this hub may in well known manner be slightly tapered throughout or over an end length thereof including its discharge end, without in any way affecting the present invention. Accordingly, the hub of the feed screw, by being described as substantially cylindrical throughout in the appended claims, is intended to cover also a hub which throughout or in part is slightly tapered.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In extrusion apparatus, the combination with an extrusion cylinder having an inner wall of substantially uniform diameter throughout, an extrusion head and an interposed breaker plate having its face toward the cylinder extending in a first plane normal to the cylinder axis, of a feed screw in said cylinder rotary therein in a normal stock-feeding direction and having a cylindrical core of substantially uniform diameter throughout and extending with one end into close proximity to said breaker plate, with said one core end being formed by two adjacent core end surfaces each of semicircular sector extent and both lying in planes, respectively, which form with said first plane identical acute angles pointing inwardly from said cylinder wall and which intersect each other and a plane in which the screw axis lies along a single line constituting the meeting edge of said core end surfaces and extending normal to the screw axis, and two equiangularly spaced unidirectional helical flights on said core of substantially uniform height throughout and extending with one end to said one core end and being thereat coplanar therewith, with the turnwise trailing terminal edges of said flights being continuous and extending in line with the meeting edge of said core end surfaces, said core end surfaces and adjacent flight ends and said edges serve to wedge stock into, and wipe stock from, said breaker plate, respectively, on rotation of said feed screw in said normal direction.

2. The combination in extrusion apparatus as set forth in claim 1, in which one of said flights extends throughout the longitudinal expanse of said screw core in said cylinder, and the other flight extends only over an end length of said screw core from said one end thereof.

3. A stock impeller for use in an extrusion cylinder, comprising a screw adapted for rotation in a normal direction to feed stock and having a cylindrical core of substantially uniform diameter throughout, with one end of said core being formed by two adjacent core end surfaces each of semicircular sector extent and both lying in first planes, respectively, which intersect each other and a plane in which the screw axis lies along a single line extending normal to the latter and constituting the meeting and foremost edge of said core end surfaces and screw, respectively, said core end surfaces forming identical acute angles with a plane normal to the screw axis and coincident with said meeting edge, and two equiangularly spaced unidirectional helical flights on said core of substantially uniform height throughout and extending with one end to said one core end and being thereat coplanar therewith, with the turnwise trailing terminal edges of said flights being continuous and extending in line with the meeting edge of said core end surfaces.

4. A stock impeller as set forth in claim 3, in which one of said flights extends throughout the longitudinal expanse of said screw, and the other flight extends only over an end length of said screw from said one core end thereof.

References Cited in the file of this patent

UNITED STATES PATENTS

| | | |
|---|---|---|
| 746,696 | Hall | Dec. 15, 1903 |
| 2,412,709 | Bowling | Dec. 17, 1946 |
| 2,595,210 | Clinefelter | Apr. 29, 1952 |